United States Patent [19]
Liu et al.

[11] Patent Number: 5,978,900
[45] Date of Patent: Nov. 2, 1999

[54] RENAMING NUMERIC AND SEGMENT REGISTERS USING COMMON GENERAL REGISTER POOL

[75] Inventors: Kin-Yip Liu, Millbrae; Gary Hammond, Campbell; Kenneth Shoemaker, Los Altos Hill; Anand Pai, San Jose, all of Calif.

[73] Assignee: Intel Corporation, Santa Clara, Calif.

[21] Appl. No.: 08/774,744

[22] Filed: Dec. 30, 1996

[51] Int. Cl.⁶ ........................................................ G06F 9/34
[52] U.S. Cl. .......................... 712/216; 711/208; 712/217; 712/23
[58] Field of Search .................................. 395/392, 393, 395/394, 800.23; 711/206, 208; 712/216, 217, 23

[56] References Cited

U.S. PATENT DOCUMENTS

| | | | |
|---|---|---|---|
| 4,972,338 | 11/1990 | Crawford et al. | 711/206 |
| 5,226,126 | 7/1993 | McFarland et al. | 712/218 |
| 5,448,705 | 9/1995 | Nguyen et al. | 712/244 |
| 5,463,745 | 10/1995 | Vidwans et al. | 712/218 |
| 5,465,336 | 11/1995 | Imai et al. | 711/207 |
| 5,487,156 | 1/1996 | Popescu et al. | 712/217 |
| 5,497,499 | 3/1996 | Garg et al. | 712/217 |
| 5,517,657 | 5/1996 | Rodgers et al. | 711/169 |
| 5,590,352 | 12/1996 | Zuraski, Jr. et al. | 712/23 |
| 5,596,735 | 1/1997 | Hervin et al. | 712/239 |
| 5,632,023 | 5/1997 | White et al. | 712/218 |
| 5,710,902 | 1/1998 | Sheaffer et al. | 712/216 |
| 5,781,753 | 7/1998 | McFarland et al. | 712/209 |

OTHER PUBLICATIONS

Popescu et al. Jun. (1991) IEEE Micro., No. 3, pp. 10–13; 63–73 "The Metaflow Architecture".

Linley Gwennap Feb. (1997) Microprocessor Report, vol. 11, No. 2, pp. 1, 6–8 "Klamath extends P6 Family".

*Primary Examiner*—Kenneth S. Kim
*Attorney, Agent, or Firm*—Blakely, Sokoloff, Taylor & Zafman LLP

[57] ABSTRACT

A microprocessor capable of renaming a numeric register and a segment register includes a plurality of general registers and a data dependency unit. The data dependency unit is configured to receive instructions to be executed, wherein the instructions include accessing the numeric register and accessing the segment register. The data dependency unit renames the numeric register as one of the plurality of general registers for each of the instructions accessing said numeric register, renames the segment register as one of the plurality of general registers for each of the instructions accessing the segment register, and generates a dependency vector for each of the instructions. The microprocessor may include a scheduler configured to receive the instructions and dependency vector and schedule the instructions for execution based on the dependency vector, and an execution engine adapted to receive the instructions from the scheduler and execute the instructions.

15 Claims, 7 Drawing Sheets

RENAMING NUMERIC AND SEGMENT REGISTERS USING COMMON GENERAL REGISTER POOL

BACKGROUND OF THE INVENTION

1. Field of the Invention

This invention relates in general to the field of computing and, more particularly, to a means of increasing data flow in an out-of-order processing system. Specifically, the invention relates to the renaming of segment registers to enhance out-of-order processing.

2. Description of the Related Art

Register renaming is known to those of ordinary skill in the art. To implement register renaming, a processor typically redirects an instruction to store information at a newly allocated register, rather than the original register identified in the instruction. A subsequent instruction that attempts to read the original register is similarly redirected to the newly allocated register. Thus, the hardware renames each original register identifier in each instruction to identify a new register, such that the same original register identifier in several different instructions may access different physical registers.

Figure 1:
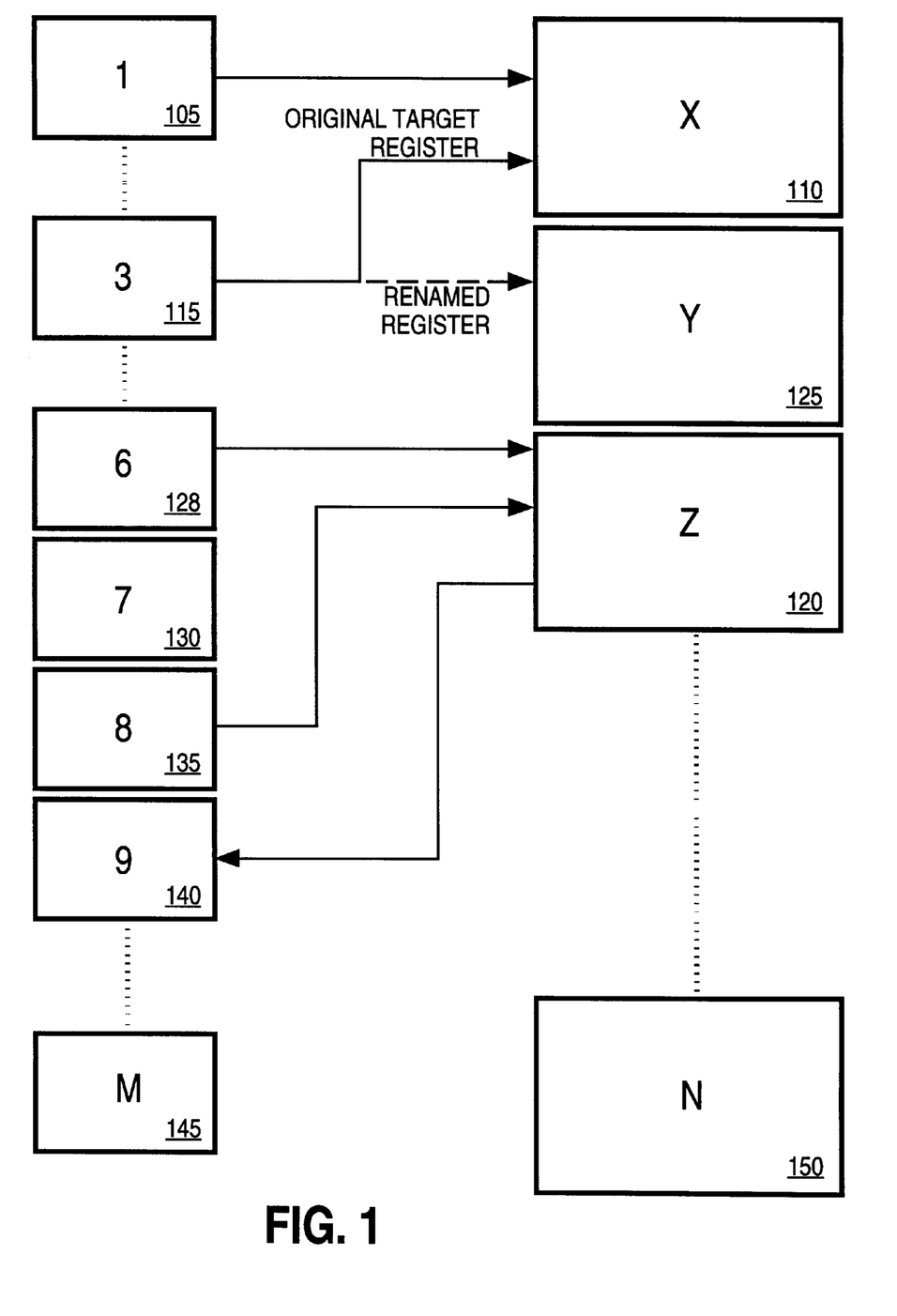
FIG. 1 is a block diagram of register usage in a program designed to illustrate the advantage of register renaming in an out-of-order processing system.

Since storage conflicts introduce constraints that may not be necessary to produce correct results, register renaming can be particularly helpful when processing instructions out-of-order. FIG. 1 illustrates the value of register renaming in an out-of-order processing system. An application program consists of M separate instructions, which in an in-order processing system could be executed in the sequential order shown without error. However, because of a storage conflict regarding a register X used in the application program, executing the program illustrated in FIG. 1 in an out-of-order processing system may introduce undesirable errors. The first instruction 105 writes data to a register X 110 from a set of N registers. Likewise, the third instruction 115 also writes data to the register X 110. The second instruction (not shown) adds the contents of register X 110 with the contents of a register Z 120. Due to storage conflicts (i.e., instructions one and three require the same register), the third instruction 105 should not be executed until the first two instructions have been performed. Register renaming allows the first instruction 105 to write to the register X 110 and redirects the third instruction 115 to write to a register Y 125, thus allowing the third instruction to be executed before the second instruction if desired. Instructions after the third instruction referencing the register X of instruction three would likewise be redirected to register Y. Out-of-order processing made possible by register renaming enables the removal of storage conflicts by allocating some registers as temporary storage registers.

Segmentation, as used in some computer architectures (e.g., Intel Architecture), is also a technique well known to those of ordinary skill in the art. Information inside a microprocessor is tracked using a logical address rather than a physical address. The memory management unit takes each logical address and translates it into a physical address that corresponds to a particular hardware location in main memory. To effectively do this, the memory management unit employs segmentation, which is a technique that provides each program with a unique address space in main memory known as a segment. Logical addresses are used to keep track of processed information; they are composed of a segment selector and an offset. The segment selector is an index used to locate the appropriate segment descriptor from a descriptor table in main memory. Segment descriptors contain information about the requested segment such as base address, size, and access rights. Once a logical address is sent to the memory management unit, the segment selector is compared with a segment register in the segmentation circuitry. The segment register contains the base address and size for the current segment descriptors so that a logical to physical address translation can be performed.

Instructions accessing segment registers have the same forced conflict limitations as instructions accessing other registers. If two instructions access the same segment register, the second and subsequent instructions cannot be processed until the instructions following the first access to the segment register have retired. Previous microprocessors have renamed segment registers to remove these forced conflicts and enhance out-of-order processing. Segment registers are typically stored in separate register stacks, resulting in the need for separate renaming and alias tracking hardware. This duplicative hardware results in higher circuit complexity and increased microprocessor cost.

SUMMARY OF INVENTION

In one aspect of the present invention, a microprocessor capable of renaming a numeric register and a segment register includes a plurality of general registers and a data dependency unit. The data dependency unit is configured to receive instructions to be executed, wherein the instructions include accessing the numeric register and accessing the segment register. The data dependency unit renames the numeric register as one of the plurality of general registers for each of the instructions accessing said numeric register, renames the segment register as one of the plurality of general registers for each of the instructions accessing the segment register, and generates a dependency vector for each of the instructions.

In another aspect of the instant invention, a method is provided for renaming a numeric register and a segment register in a microprocessor. The method includes fetching instructions to be executed by the microprocessor, wherein the instructions include accessing the numeric register and the segment register; renaming the numeric register to one of a plurality of general registers for each of the instructions accessing the numeric register; renaming the segment register to one of a plurality of general registers for each of the instructions accessing the segment register and; determining the dependency of each instruction on the execution of another of the instructions; and generating a dependency vector indicative of the determined dependency.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below as it might be employed in the renaming of segment registers as general purpose registers. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
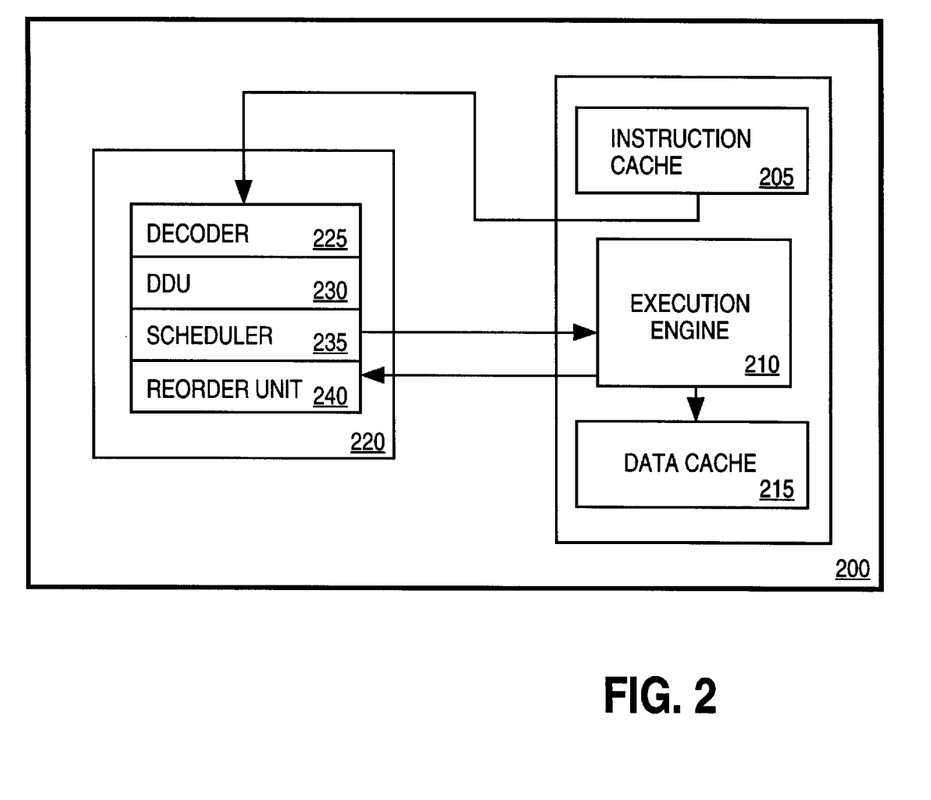
FIG. 2 is a top level block diagram of select components contained in a microprocessor.

Turning now to the drawings, and in particular to FIG. 2, a microprocessor 200 is shown comprised of a plurality of components, including an instruction cache 205, a CISC front end 220, a RISC execution engine 210, and a data cache 215. Generally, the instruction cache 205 receives and stores programming instructions, the execution engine 210 executes the commands that it receives, and the data cache 215 stores the data that results from execution of the instructions. The particular microprocessor 200 described herein is capable of executing both reduced instruction set computer (RISC) type instructions and complex instruction set computer (CISC) type instructions (e.g., Intel X86 (iA) instructions). The RISC type instructions are executed directly by the RISC execution engine 210, and the CISC type instructions are first translated by the CISC front end 220 into RISC type instructions for execution by the RISC execution engine 210. The invention is not limited in its application to a microprocessor capable of executing two instruction sets.

Translation within the CISC front end 220 is accomplished by the operation of a decoder 225, Dependency Determination Unit (DDU) 230, scheduler 235, and a reorder unit 240. Renaming of registers occurs generally within the CISC front end 220, and in particular, within the DDU 230. The DDU 230 renames numeric registers and segment registers using the same hardware. Accordingly, the following description focuses generally on the CISC front end 220, and particularly on the structure and operation of the DDU 230.

In the illustrated example, the DDU 230 is primarily renaming integer registers and segment registers, but the application of this invention is not limited to only integer and segment registers. Renaming of other numeric registers (e.g. floating point registers) is contemplated.

Figure 3:
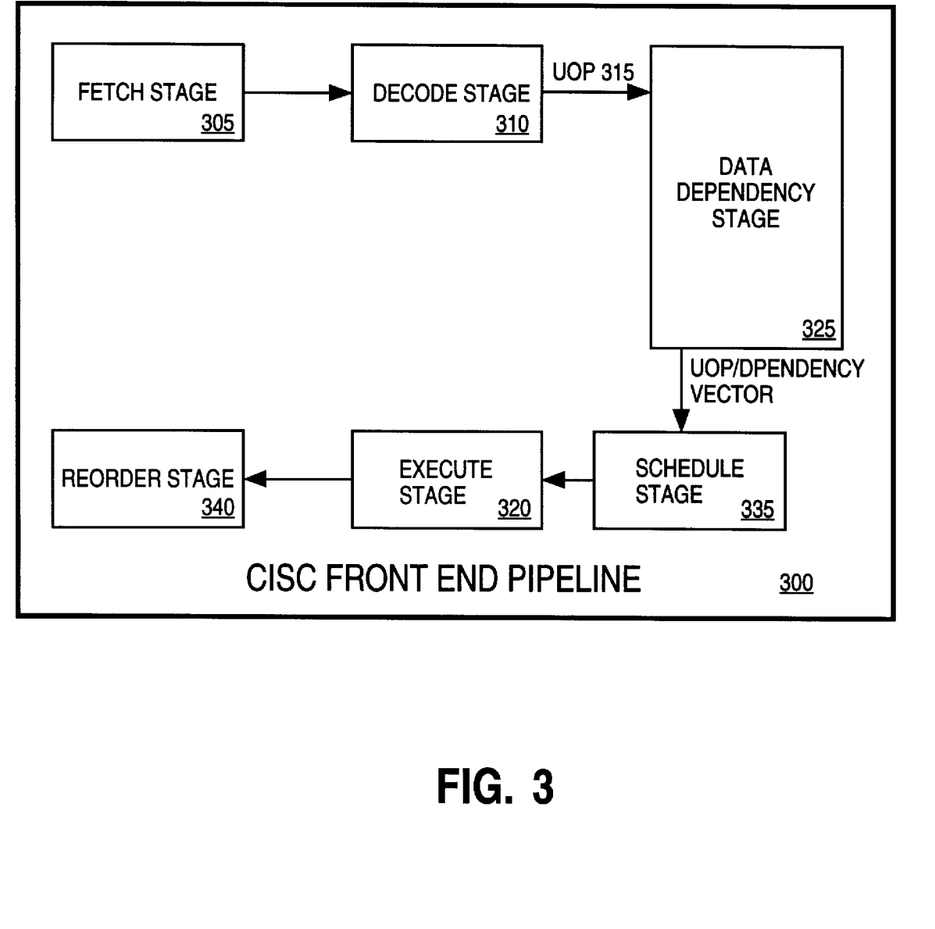
FIG. 3 is a block diagram of a complex instruction set computer (CISC) front end pipeline as implemented in the microprocessor of FIG. 2.

The operation of the CISC front end 220 is better appreciated by reference to the block diagram of FIG. 3. The CISC front end 220 contains a pipeline which is a serial arrangement of registers in which a task is performed at each register stage, and then the results are passed to the next register stage, enabling several parts of different tasks to be performed at the same time. A block diagram of the pipeline 300 for CISC front end 220 is illustrated in FIG. 3. The first block in the pipeline is a fetch stage 305 that retrieves CISC type instructions from the instruction cache 205. The decode stage 310 takes the CISC type instructions and breaks them down into one or more steps known as micro-operations (uops) 315 that can be executed by the RISC execution engine 210 in the execute stage 320. The uops 315 leave the decode stage 310 and enter the data dependency stage 325. The data dependency stage 325 has two major tasks: 1) translate the logical register identifier of the uop 315 into a physical register identifier, and 2) provide dependency information about the uop 315. The dependency information takes the form of a dependency vector, which in the described embodiment is 40-bits long with each bit position representing one of 40 locations in the scheduler 235 during the schedule stage 335. The scheduler 235 may contain up to 40 uops 315 waiting to be executed. Thus, the dependency vector will indicate which, if any, of these 40 uops awaiting execution are dependent upon the uop 315 currently being handled by the DDU 230 in the data dependency stage 325. For example, as illustrated in FIG. 1, the sixth instruction 128 writes to register Z 120. Instruction seven 130 manipulates the value stored in register Z 120 and instruction eight 135 writes the new value in register Z 120. Instruction nine 140 reads the value stored in register Z 120. In this example, instruction nine 140 cannot be executed prior to the completion of instruction 8 due to the read after write dependency between instructions eight and nine. Therefore, the dependency between the eighth and ninth instructions 135, 140 would be indicated by the resulting dependency vector of the ninth instruction 140. That is, if the eighth instruction 135 is stored at location number 3 of the scheduler 335, then the ninth instruction's dependency vector would be:

0000000000000000000000000000000000000100.

Within the DDU 230, an integer register alias table (IRAT) 405, which is discussed in greater detail below in reference to FIGS. 4 through 6, actually performs the task of renaming segment registers and removing storage conflicts. Once the uops 315 and dependency vector leave the data dependency stage 325, they enter the schedule stage 335. The scheduler 235 schedules the 40 uops 315 to be executed based at least in part on whether any of the bits of its dependency vector are set. That is, the scheduler 235 will not schedule an instruction that has a bit set in its dependency vector set. Rather, the scheduler 235 will wait until such time as the instruction has no bits set in its dependency vector. Each time a uop 315 is dispatched by the scheduler 235, the corresponding bits of all remaining uops 315 is cleared, potentially making these formally dependent uops 315 available for dispatch. For example, in the example illustrated and discussed with respect to FIG. 1, once the scheduler 235 dispatches the eighth instruction 135 from storage location number 3, all other instructions stored in the scheduler 235 have bit number 3 cleared, making the ninth instructions dependency vector:

0000000000000000000000000000000000000000.

In this manner of dispatching only instructions with zeroed dependency vectors, uops 315 are processed out-of-order. The rearranged uops 315 are sent to the execute stage 320 where they are executed. Once executed, the uops 315 enter the reorder stage 340 where they are put back in the original order that the program originally specified by the reorder unit 240.

Figure 4:
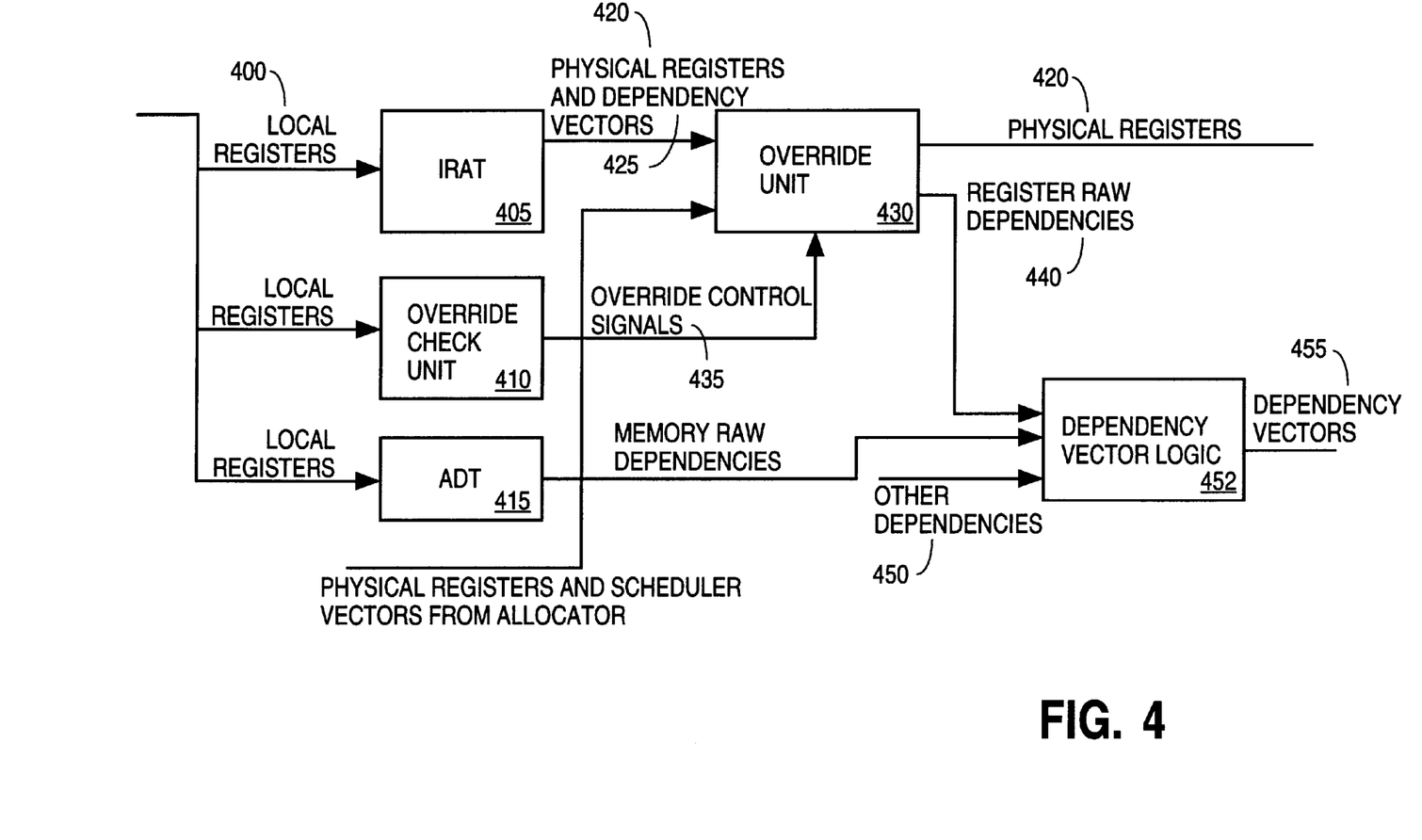
FIG. 4 is a top level block diagram of the data dependency unit of the microprocessor of FIG. 2.

The structure and operation of the DDU 230 is shown in greater detail in conjunction with FIG. 4. As shown in FIG. 4, the DDU 230 is comprised of five major components an integer register alias table (IRAT) 405, an override check unit 410, an address disambiguation table (ADT) 415, an override unit 430, and dependency vector logic 452. Generally, the IRAT 405 is responsible for renaming and maintaining dependency information for the renamed registers. The override check unit 410 will, however, under select circumstances override the renaming assignments determined by the IRAT 405. The dependency vector logic 452 operates to logically OR the dependency vectors determined by the IRAT 405 or override check unit 410 with those determined by the ADT 415 and other dependencies generated elsewhere to arrive at a 40-bit dependency vector that may have multiple dependencies indicated by multiple bits being set.

The IRAT 405 actually maintains two sets of mappings between logical and physical registers, one for speculative state and one for architectural state. The speculative mapping applies to uops 315 entering the out-of-order pipeline 300. The architectural mapping is maintained synchronous with retirement. When the out-of-order engine is flushed, the architectural alias table is flash copied in the speculative alias table. After a pipeline flush, the speculative states have no meaning, and thus, are discarded in favor of the architectural state of the machine.

Figure 5:
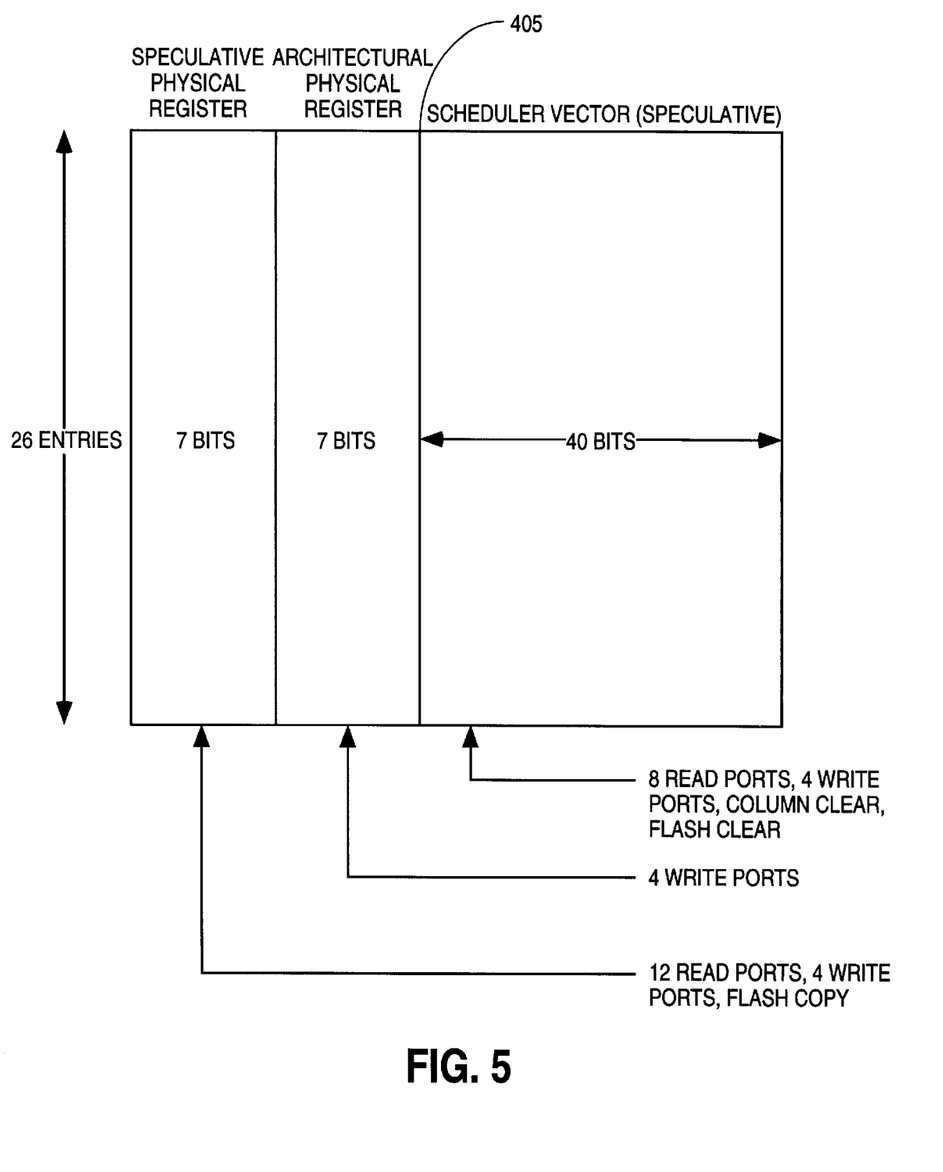
FIG. 5 is a block diagram of the register alias table of the data dependency unit of FIGS. 3 and 6.
Figure 6:
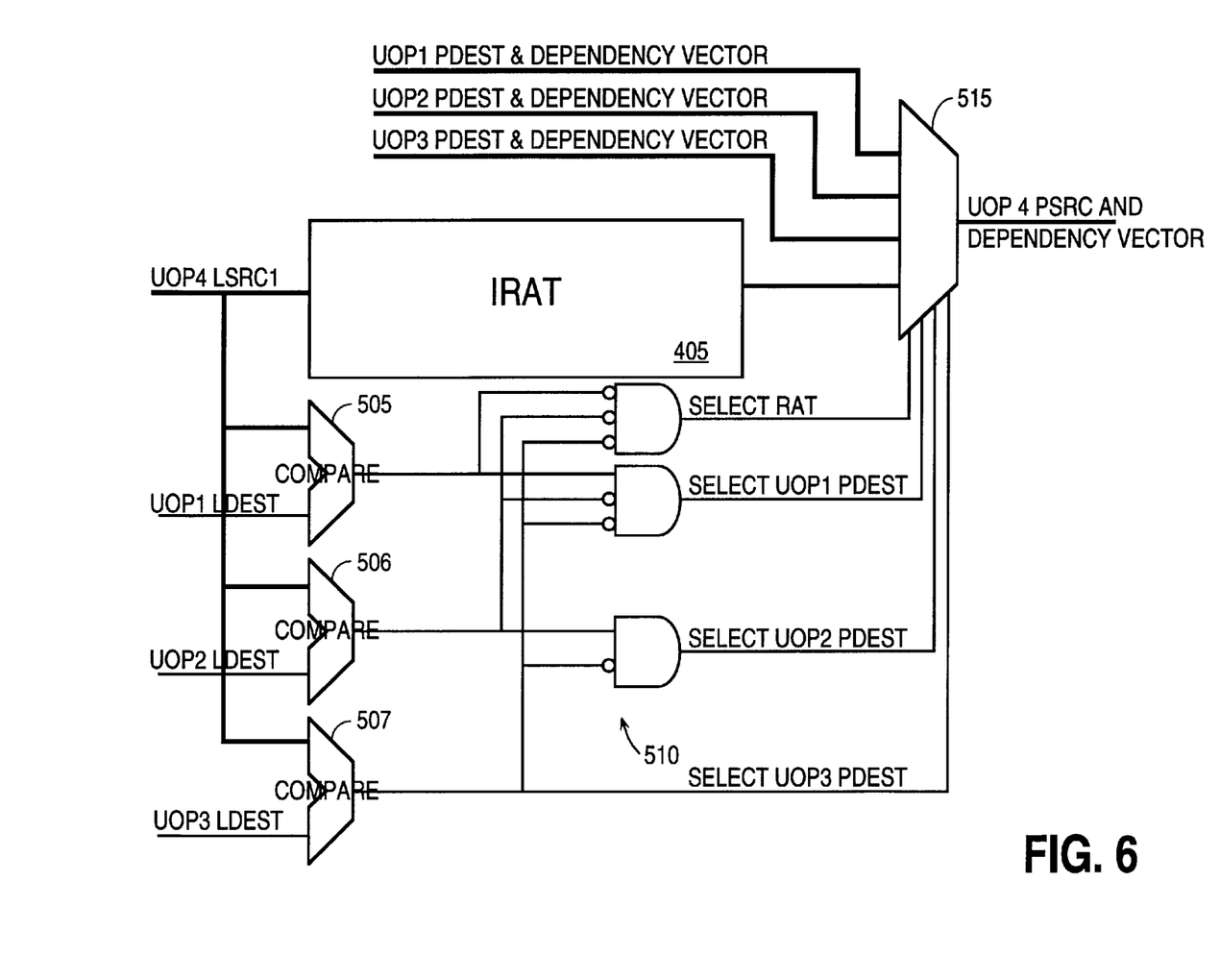
FIG. 6 is a block diagram of the integer register alias table of FIG. 4.

The organization and structure of the IRAT 405 is represented in FIGS. 5 and 6. FIG. 5 shows the organization of the IRAT 405. The IRAT 405, by itself, translates logical to physical registers essentially as a look-up table. The IRAT 405 has 3 fields: a 7-bit speculative physical register number (PREG), a 7-bit architectural physical register number, and a 40-bit scheduler vector. The translation performed by the IRAT 405 is used only when no dependency is determined to exist for the present uop 315. Dependencies are detected by the exemplary circuitry shown associated with the IRAT 405 in FIG. 6.

In the illustrated embodiment, up to four uops 315 are provided to the IRAT 405 during each clock cycle, and read after write (RAW) dependencies between these four uops 315 are checked by the IRAT 405. By way of example, the circuitry associated with the most complicated dependency check, RAW dependencies for uop number 4, is shown in FIG. 6. The circuitry associated with detecting RAW dependencies for uop numbers 3, 2, and 1 are progressively simpler. In determining a RAW dependency for uop number 4, its logical source is compared with the logical destination of each of the previous uops, 1–3, by comparators 505, 506 and 507. A match at one of the comparators 505–507 indicates that uop number 4 is attempting to read a register that was previously written by one of the preceding uops 1–3, respectively. A series of inverters and AND gates 510 operate to prioritize the signals when more than one match occurs. In the illustrated embodiment, the order of priority from highest to lowest is uop number 3 to uop number 1.

The output of the prioritization logic 510 is used as the select input of a multiplexer 515, which in the event of a miss will pass the output of the IRAT 405, and in the event of a hit will pass the physical destination and dependency vector of the corresponding uop. That is, for example, where uop number 4 is attempting to read the same register written by uop number 2, the multiplexer 515 will select the physical destination register associated with uop 2 and use the scheduler vector of uop number 2 as the dependency vector for uop number 4.

Similarly, write after write (WAW) dependencies between these four uops 315 are checked by the IRAT 405 using logic substantially similar to that shown in FIG. 6. Rather than compare the logical source of each uop with all previous logical destinations, as is done in the case of RAW dependencies, the logical destination of each uop is compared with all previous logical destinations to determine WAW dependencies.

Referring once again to FIG. 4, during the operation of the Decoder 310, a uop 315 that attempts to read or write a segment register is identified and supplied to the IRAT 405. The IRAT 405 assigns a physical, or hardware, register address 420 from the plurality of available physical register addresses for each logical register address 400 associated with a segment register. A dependency vector 425, which indicates the relation between registers is also assigned to each of the logical registers 400 associated with a segment register.

The physical register address 420 and dependency vector 425 are sent to the override unit 430, which receives override control signals 435 from the override check unit 410. The override check unit 410 and override unit 430 recognize true dependencies (i.e., dependencies that cannot be overcome by additional storage space). At the output of the override unit 430, the read after write (RAW) dependencies 440 are sent to the dependency vector logic 452 which also receives input from other dependencies 450 and an address disambiguation table (ADT) 415, which indicate dependencies that occur during accesses to memory. The dependency vector logic 452 logically OR the dependency vectors from the various sources to produce a single 40-bit dependency vector 455 used by the scheduler 335.

The current invention overcomes the problems of renaming segment registers by using the same pool of physical registers for renaming. As a result, hardware that supports all the integer registers also supports segment register renaming. The processor 200 described above can take full advantage of the dataflow and dynamic execution mechanism without additional hardware.

Figure 7:
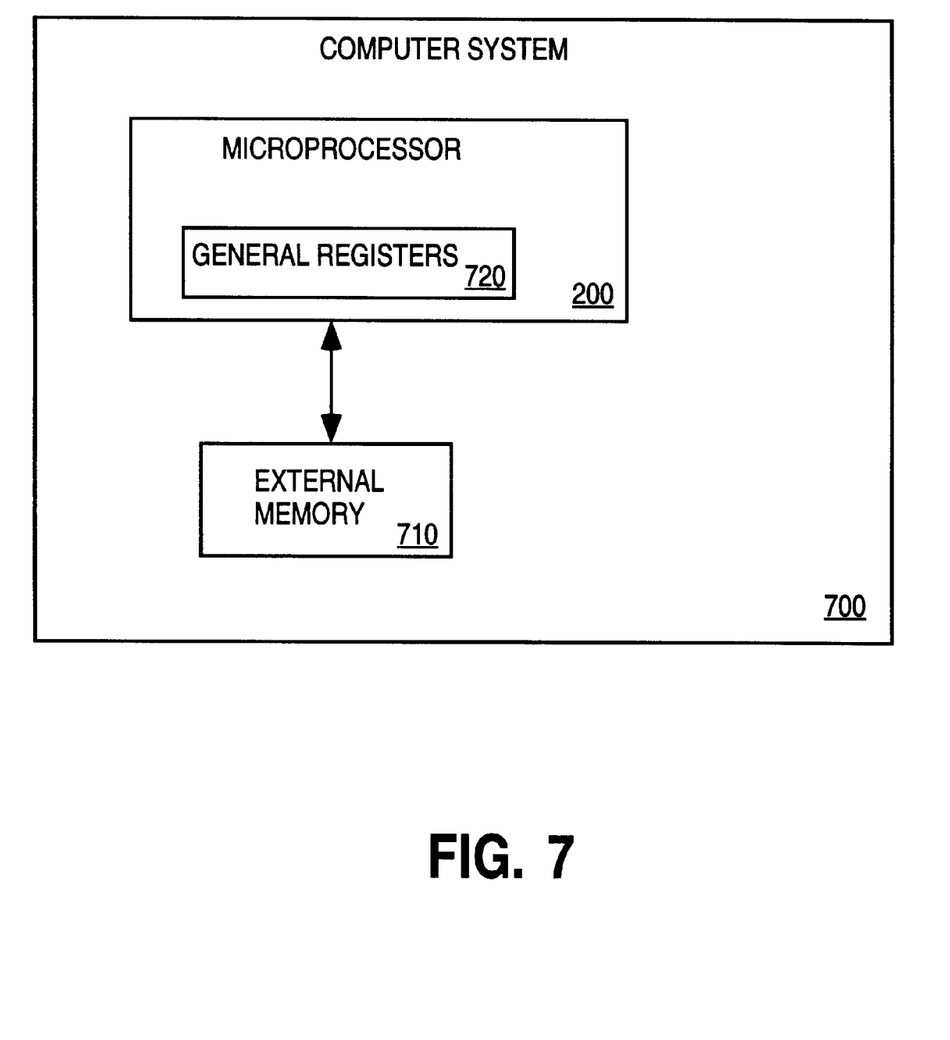
FIG. 7 is a block diagram of a computer system containing the microprocessor of FIG. 2.

Figure shows a block diagram of a computer system 700 containing the microprocessor 200. An external memory 710 contains program instructions to be executed by the microprocessor 200. The instructions access numeric registers, such as integer registers, and segment registers. The DDU 230 renames the numeric registers and the segment registers as one of the general registers 720, and generates a dependency vector 455 for each instruction.

It will be appreciated by those of ordinary skill in the art having the benefit of this disclosure that numerous variations from the foregoing illustration will be possible without departing from the inventive concept described therein. Accordingly, it is the claims set forth below, and not merely the foregoing illustration, which are intended to define the exclusive rights claimed in this application.

We claim:

1. A microprocessor comprising:
   a data dependency unit adapted to receive instructions for accessing a numeric register and a segment register, wherein said data dependency unit is further adapted to rename said numeric register as a first of a plurality of general registers for each of said instructions accessing said numeric register and rename said segment register as a second of said plurality of general registers for each of said instructions accessing said segment register, wherein said first and second general registers are located in the same pool of the plurality of general registers.

2. The microprocessor as in claim 1 wherein said data dependency unit is further adapted to generate a dependency vector for each of said instructions.

3. The microprocessor as in claim 2 including:
- a scheduler adapted to receive said instructions and dependency vectors from said data dependency unit and schedule said instructions for execution based on said dependency vectors; and
- an execution engine adapted to receive said instructions from said scheduler and execute said instructions.

4. The microprocessor as in claim 1, wherein said instructions comprise micro-operations and said microprocessor includes:
- a decoder adapted to receive a first set of instructions to be executed and break down said first set of instructions into micro-operations.

5. The microprocessor as in claim 1, wherein said numeric register comprises an integer register.

6. A method for renaming a numeric register and a segment register in a microprocessor, comprising:
- a) fetching instructions to be executed by said microprocessor, wherein said instructions include accessing the numeric register and the segment register;
- b) renaming the numeric register to a first of a plurality of general registers for each of said instructions accessing the numeric register; and
- c) renaming the segment register to a second of the plurality of general registers for each of said instructions accessing the segment register;
  - wherein the first and second general registers are located in the same pool of the plurality of general registers.

7. The method as in claim 6, further comprising:
- d) determining the dependency of each said instruction on the execution of another of said instructions and generating a dependency vector indicative of said determined dependency.

8. The method as in claim 7, further comprising:
- e) scheduling the order of execution for said instructions based on said dependency vector; and
- f) executing said instructions.

9. The method as in claim 6, wherein said instructions comprise micro-operations, further comprising:
- e) decoding a first set of instructions into micro-operations.

10. A computer system comprising:
- a) a microprocessor; and
- b) an external memory containing a plurality of instructions to be executed by said microprocessor,
  - said microprocessor including
    - a data dependency unit adapted to receive an instruction from said external memory for accessing a numeric register and a segment register, wherein said data dependency unit is further adapted to rename said numeric register as a first of a plurality of general registers for each of said instructions accessing said numeric register and rename said segment register as a second of said plurality of general registers for each of said instructions accessing said segment register, wherein said first and second general registers are located in the same pool of the plurality of general registers.

11. The computer system as in claim 10, wherein said data dependency unit generates a dependency vector for each of said instructions.

12. The computer system as in claim 11, wherein said microprocessor includes a scheduler adapted to receive said instructions and dependency vectors and schedule said instructions for execution based on said dependency vectors.

13. The computer system as in claim 10, wherein said numeric register comprises an integer register.

14. The computer system as in claim 12, wherein said microprocessor includes an execution engine adapted to receive said instructions from said scheduler and execute said instructions.

15. The computer system as in claim 10, wherein said numeric register comprises a floating point register.

* * * * *